H. HOLLINGDRAKE.
IN-MOTION RECORDER FOR ROAD VEHICLES.
APPLICATION FILED NOV. 2, 1917.

1,282,693.

Patented Oct. 22, 1918.
3 SHEETS—SHEET 1.

INVENTOR.
Henry Hollingdrake

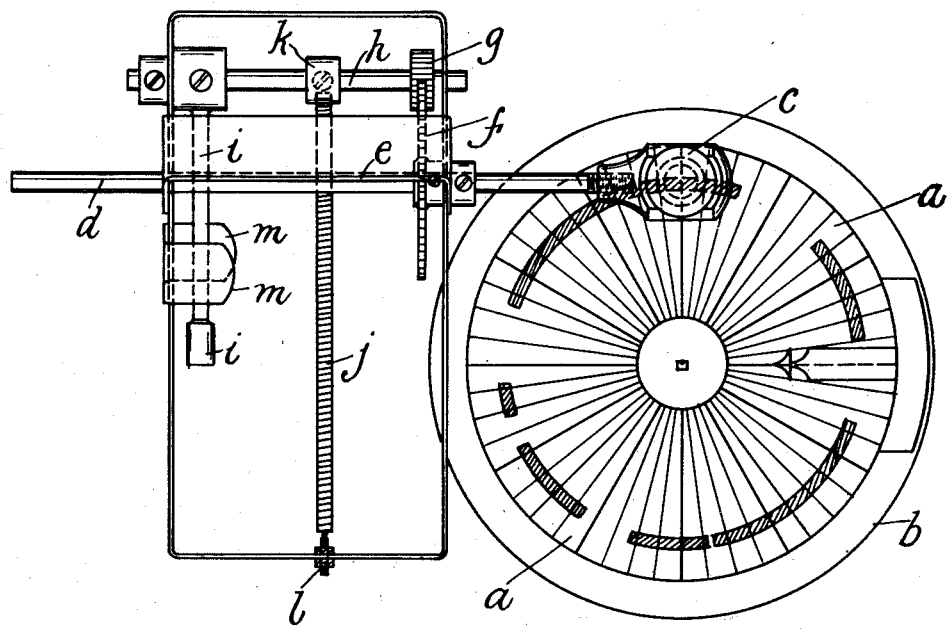

H. HOLLINGDRAKE.
IN-MOTION RECORDER FOR ROAD VEHICLES.
APPLICATION FILED NOV. 2, 1917.
1,282,693.
Patented Oct. 22, 1918.
3 SHEETS—SHEET 3.
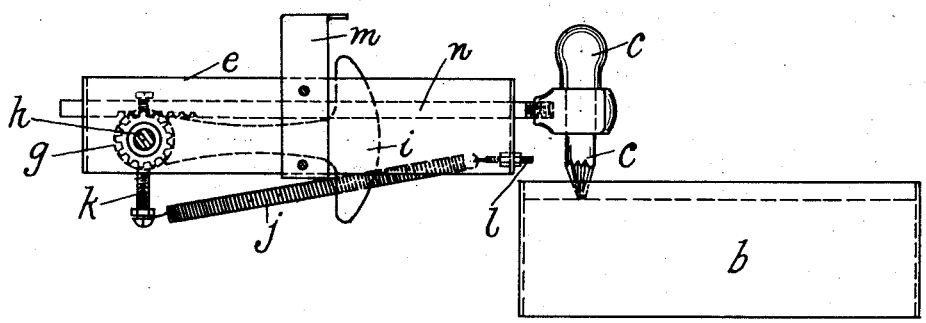
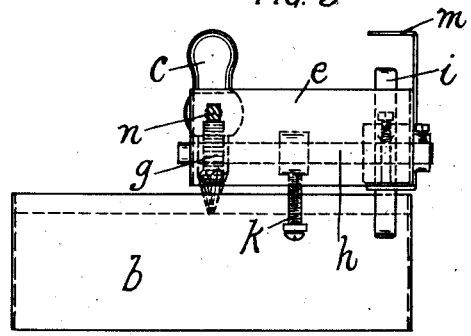
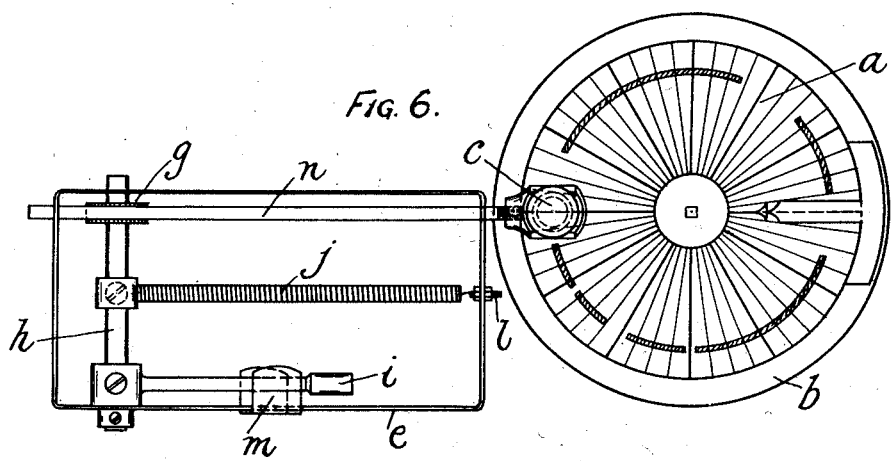
INVENTOR:
Henry Hollingdrake

UNITED STATES PATENT OFFICE.

HENRY HOLLINGDRAKE, OF STOCKPORT, ENGLAND.

IN-MOTION RECORDER FOR ROAD-VEHICLES.

1,282,693.  Specification of Letters Patent.  Patented Oct. 22, 1918.

Application filed November 2, 1917. Serial No. 199,850.

*To all whom it may concern:*

Be it known that I, HENRY HOLLINGDRAKE, a subject of the King of Great Britain, residing at Prince's street, Stockport, in the county of Chester, England, have invented new and useful Improvements in In-Motion Recorders for Road-Vehicles, of which the following is a specification.

My invention relates to improvements in "in-motion" recorders for road vehicles to indicate the exact times at which the vehicle is either "in-motion" or at rest, and in one type of which a vertically reciprocating and non-rotatable weight riding on a spring is mounted upon a vertical screw threaded rotatable spindle with a pinion engaging a horizontally reciprocating rack adapted to operate means for marking a record-disk rotated by clockwork when the weight is jolted or moved vertically up and down by the vibration of the vehicle. In another type the marker consists of an adjustable recording point carried by a spring-controlled bell-crank pivoted to a pendulum pivoted on trunnions, so that the pendulum when oscillating causes the recording-point to mark the traveling record surface.

According to my invention instead of forming the weight as a nut mounted upon a vertical screw threaded rotatable spindle, I make it in the form of a hammer or weight head the arm of which is mounted upon an oscillatory shaft supported in suitable bearings near the rotary record-disk. The weight preferably rides upon a spring or the shaft is influenced by a spring or the weight is influenced by a spring or both the shaft and the weight are influenced by a spring or springs in order to make the mechanism more sensitive although the use of a spring or springs is not absolutely essential, and preferably also the motion of the weight is limited by stops.

The vibration or jolting of the motor lorry or other road vehicle, when in motion, causes the weight to swing up and down in the arc of a circle, and the oscillatory motion thereby imparted to the shaft is transmitted by a pinion and horizontally reciprocating rack or any equivalent gear or means to the style or equivalent by which the record disk is marked, such markings being more pronounced when the vehicle is traveling empty than when it is loaded.

I illustrate an embodiment of my invention in the accompanying three sheets of drawings in which—

Fig. 4 is a front elevation. Fig. 5 an end elevation and Fig. 6 a plan showing the pencil operated by a horizontal rack and pinion instead of a wheel and pinion as in Figs. 1 to 3.

Figure 1:
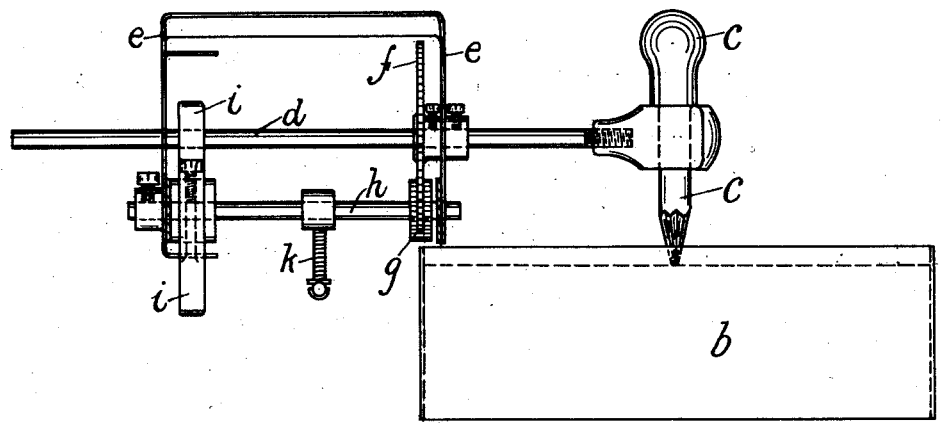
Figure 1 is a front elevation.
Figure 2:
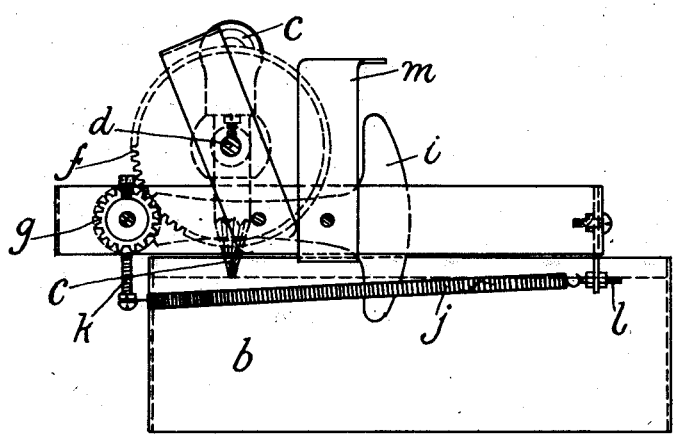
Fig. 2 is an end elevation and Fig. 3 a plan of my improved "in-motion" recorder.

In these views,—$a$ designates the paper or other record disk which is divided say into hours and quarter hours or other divisions, and which is mounted upon a drum $b$ rotated by clockwork in the usual way. The style $c$ or equivalent marker is mounted on a horizontal oscillatory shaft $d$ journaled in a frame $e$ and geared by a spur wheel $f$ to a pinion $g$ fixed on a second horizontal oscillatory shaft $h$, on which is also mounted the hammer shaped weight $i$. The oscillatory shaft $h$ and hammer weight $i$ are spring influenced and controlled in any convenient way, as for instance in the example given they are influenced by a coiled spring $j$ connected at one end to an arm $k$ on the shaft $h$, and at the other end to a tension adjusting screw $l$ on the frame. The oscillations of the hammer weight $i$ are limited in either direction by the stops $m$. The whole apparatus is preferably inclosed within a locked box placed in any convenient position on the motor lorry or other road vehicle. It will thus be evident that as the vibrations or jolting of the vehicle causes the hammer weight $i$ to swing up and down in the arc of a circle it imparts an oscillatory motion to the shaft $h$ and so through the gears $g$ and $f$ or equivalent gearing to the shaft $d$ and style $c$ or equivalent by which the traveling record disk $a$ is marked, such markings, as already stated, being more pronounced when the vehicle is traveling empty than when it is loaded.

In Figs. 4, 5 and 6 the style $c$ or equivalent marker is mounted on a horizontal rack $n$ guided in a frame $e$ and geared to a pinion $g$ fixed on a horizontal oscillatory shaft $h$, on which is also mounted the hammer shaped weight $i$. The oscillatory shaft $h$ and hammer weight $i$ are spring influenced and controlled in any convenient way as for instance, in the example given, they are influenced by a coiled spring $j$ connected at one end to an arm $k$ on the shaft $h$ and at the other end to a tension adjusting screw $l$ on the frame $e$. The oscillations of the hammer weight $i$ are limited in either direction by the stops $m$. The whole apparatus is preferably inclosed within a locked box placed in any convenient position on the motor lorry or other road vehicle. It will thus be evident that as the vibrations or jolting of the vehicle causes the hammer weight $i$ to swing up and down in the arc of a circle, it imparts an oscillatory motion to the shaft $h$ and so, through the pinion $g$, to the rack $n$ and style $c$ or equivalent by which the traveling record disk $a$ is marked, such markings, as already stated, being more pronounced when the vehicle is traveling empty than when it is loaded.

What I claim as my invention and desire to secure by Letters Patent of the United States is:—

1. A vibration recorder comprising a continuously moving recording sheet, a frame, a shaft journaled in said frame and biased to one position, a pinion fixed to said shaft, a horizontally disposed arm having one end thereof fixed to said shaft, a weight formed on the free end of said arm, means carried by said frame for limiting the vertical movement of said arm, a second shaft journaled in said frame, a gear fixed to said second shaft and meshing with said pinion, and a marking device contacting with said recording sheet and movable by said second shaft.

2. A vibration recorder comprising a continuously moving recording sheet, a frame, a shaft journaled in said frame and biased to one position, a pinion fixed to said shaft, a horizontally disposed arm having one end thereof fixed to said shaft, a weight formed on the free end of said arm, means carried by said frame for limiting the vertical movement of said arm, a second shaft journaled in said frame, a gear fixed to said second shaft and meshing with said pinion, and a marking device contacting with said recording sheet and fixed to said second shaft.

3. A vibration recorder comprising a continuously moving recording sheet, a frame, a shaft journaled in said frame and biased to one position, a pinion fixed to said shaft, a horizontally disposed arm having one end thereof fixed to said shaft, a weight formed on the free end of said arm, means carried by said frame for limiting the vertical movement of said arm, a horizontally disposed rack bar slidable in said frame and meshing with said pinion, and a marking device fixed to said rack bar and contacting with said recording sheet.

In testimony whereof I have signed my name to this specification in the presence of two subscribing witnesses.

HENRY HOLLINGDRAKE.

Witnesses:
S. W. GILLETT,
HERBERT ROWLAND ABBEY.